United States Patent [19]

Baldwin et al.

[11] Patent Number: 4,999,152

[45] Date of Patent: Mar. 12, 1991

[54] APPARATUS AND METHOD FOR FORMING A PLASTIC SHEET

[75] Inventors: Edward P. Baldwin, Spring Lake Township, Ottawa County, Mich.; John S. Todor, Jr., Arvada, Colo.

[73] Assignee: Adolph Coors Company, Golden, Colo.

[21] Appl. No.: 367,058

[22] Filed: Jun. 16, 1989

[51] Int. Cl.⁵ .............................................. B29C 39/14
[52] U.S. Cl. .............................. 264/555; 264/211.12; 264/556; 264/571; 425/362; 425/363; 425/388
[58] Field of Search ............... 425/362, 363, 388, 374, 425/382.3, DIG. 235; 264/555, 571, 211.12, 556, 211.13; 156/470, 498, 209, 210, 145, 360

[56] References Cited

U.S. PATENT DOCUMENTS

| | | | |
|---|---|---|---|
| 3,205,837 | 9/1965 | Fay | 425/362 X |
| 3,208,898 | 9/1965 | Chavannes et al. | 156/498 |
| 3,314,110 | 4/1967 | Missbach | 425/388 |
| 3,346,438 | 10/1967 | Chavannes | 156/210 |
| 3,416,984 | 12/1968 | Chavannes et al. | 156/209 |
| 3,655,486 | 4/1972 | Hagino et al. | 156/360 |
| 3,756,884 | 9/1973 | Hagino | 156/145 |
| 3,837,973 | 9/1974 | Asakura et al. | 156/470 |
| 3,954,368 | 5/1976 | Kawakami | 425/362 X |
| 3,999,928 | 12/1976 | Asakura et al. | 425/388 |

Primary Examiner—Richard L. Chiesa
Attorney, Agent, or Firm—Klaas & Law

[57] ABSTRACT

A method and apparatus for forming a continuous extrudate of a heated soft thermoplastic material into a continuous sheet of a cooled rigid thermoplastic material having a plurality of recesses formed in one surface thereof and a plurality of projections formed on the other surface thereof by feeding successive portions of a heated soft extruded thermoplastic material onto successive portions of a forming cylinder having a generally cylindrical outer peripheral surface having a plurality of recesses formed therein and applying a vacuum through the recesses to draw areas of successive portions opposite to the recesses into conformation with the recesses and cooling the thermoplastic material by moving a cooling fluid over the inner peripheral surface of the forming cylinder and removing the successive portions to form a continuous sheet of a rigid thermoplastic material having a plurality of recesses formed in one surface thereof and a plurality of projections formed on the other surface thereof.

20 Claims, 7 Drawing Sheets

APPARATUS AND METHOD FOR FORMING A PLASTIC SHEET

FIELD OF THE INVENTION

This invention relates generally to the extruding of a thermoplastic material and the processing thereof to form a continuous sheet of a rigid thermoplastic material which can be further processed as desired and more particularly to the formation of such a continuous sheet of the rigid thermoplastic material having a plurality of recesses formed in one surface thereof and a plurality of projections on the other surface thereof.

BACKGROUND OF THE INVENTION

One method for forming a continuous sheet of a rigid thermoplastic material involves continuously extruding a heated thermoplastic material which is fed between a pair of pull rolls each of which rotates about a generally horizontal axis so that there is a lower roll and an upper roll. After passing between the pair of pull rolls, the extruded thermoplastic material moves with the upper roll and passes between the upper roll and a texturizing roll which also rotates around a generally horizontal axis and is located above the upper pull roll. The upper roll and the texturizing roll ensure that the extruded thermoplastic material moves with the outer peripheral surface of the upper roll until it moves between the upper roll and the texturizing roll. All of the rolls are temperature controlled by flowing a cooling fluid, such as water having solubles contained therein, through the rolls to control the temperature of the outer peripheral surfaces thereof. After passing between the upper roll and the texturizing roll, the extruded thermoplastic material moves with the outer peripheral surface of the texturizing roll and is removed therefrom and pulled over a cooling conveyor by another pair of pull rolls. When it was desired to use the above-described apparatus for forming a continuous sheet of a rigid thermoplastic material having a plurality of recesses formed in one surface thereof and a plurality of projections on the other surface thereof, there existed the problem of how to form the recesses and projections and to maintain them in a desired shape while cooling the thermoplastic material to a temperature at which the thermoplastic material could be pulled over the cooling conveyor without damaging the recesses and projections formed therein.

BRIEF DESCRIPTION OF THE INVENTION

This invention provides apparatus and method for forming a continuous sheet of a rigid thermoplastic material having a plurality of recesses formed in one surface thereof and a plurality of projections on the other surface thereof using a newly invented chill roll in a conventional extruding process. The term chill is used in this application as it is known in the art to define that the temperature of the roll is controlled by passing a cooling fluid medium therethrough. The new chill roll operates to receive the relatively hot thermoplastic material from the extruder and to form a plurality of recesses and projections therein and to maintain the recesses and projections in the formed shape while cooling the thermoplastic material to a temperature at which it can be subjected to pulling force without detrimentally effecting the shape of the formed recesses and projections. While the recesses or projections can be of any desired shape, in the preferred embodiment of the invention, they are dimples and will be referred to as such in the specification.

In the preferred embodiment of the invention, the new chill roll comprises a hollow watertight forming drum comprising a forming cylinder having a longitudinal axis and a generally cylindrical outer surface having a plurality of radially inwardly extending dimples formed therein wherein the open portions of the dimples face radially outwardly and the formed dimples are in the shape of a segment of a sphere or a frustum of a sphere. The forming cylinder is provided with end covers in sealing engagement therewith and has a substantially continuous generally cylindrical inner peripheral surface to provide a watertight housing. The forming cylinder is mounted for rotation in a fixed support and is rotated by conventional drive means. A sealed vacuum drum having a longitudinal axis coinciding with the longitudinal axis of the forming cylinder is fixedly mounted inside the forming cylinder for rotation therewith and is connected to a vacuum source so that a vacuum exists at all times in the sealed vacuum drum. Cooling means are provided to direct a flow of cooling liquid, which in the preferred embodiment is water containing suitable solubles, between the forming cylinder and the sealed vacuum drum and in contact with the inner peripheral surface of the hollow forming cylinder. The vacuum drum comprises a sealed inner portion in which a vacuum always exists and an outer portion comprising a plurality of sealed compartments which are periodically connected to the inner portion to form a vacuum therein. A plurality of conduits are used to connect the plurality of dimples in the outer peripheral surface to associated compartments. Feed means are provided to feed successive portions of an extrudate comprising a continuous sheet of hot thermoplastic material into contact with the outer peripheral surface of the forming cylinder. Control means are provided for connecting successive portions of the plurality of dimples to associated compartments so that they are connected to the vacuum so as to draw areas of the continuous sheet of hot thermoplastic material radially opposite to the dimples into conformation with the surfaces defining the dimples. The continuous sheet of hot thermoplastic material remains in contact with the outer peripheral surface and the dimples of the forming cylinder until the temperature of the continuous sheet of hot thermoplastic material is lowered enough to withstand further processing without detrimental effect on the formed dimples. The vacuum to form the dimples in the continuous sheet is initially applied after the continuous sheet has been in contact with the outer peripheral surface through an arc of about 12.5 degrees and is continued until there is an arcuate distance of about 12.5 degrees before the continuous sheet separates from the outer peripheral surface. The continuous sheet moves between the forming cylinder and a texturizing chill roll, if texturizing is desired, and then moves over the texturizing chill roll to the remaining portions of the process.

BRIEF DESCRIPTION OF THE DRAWINGS

Illustrative and presently preferred embodiments of the invention are shown in the accompanying drawings in which.

DETAILED DESCRIPTION OF THE PREFERRED EMBODIMENT

Figure 1:
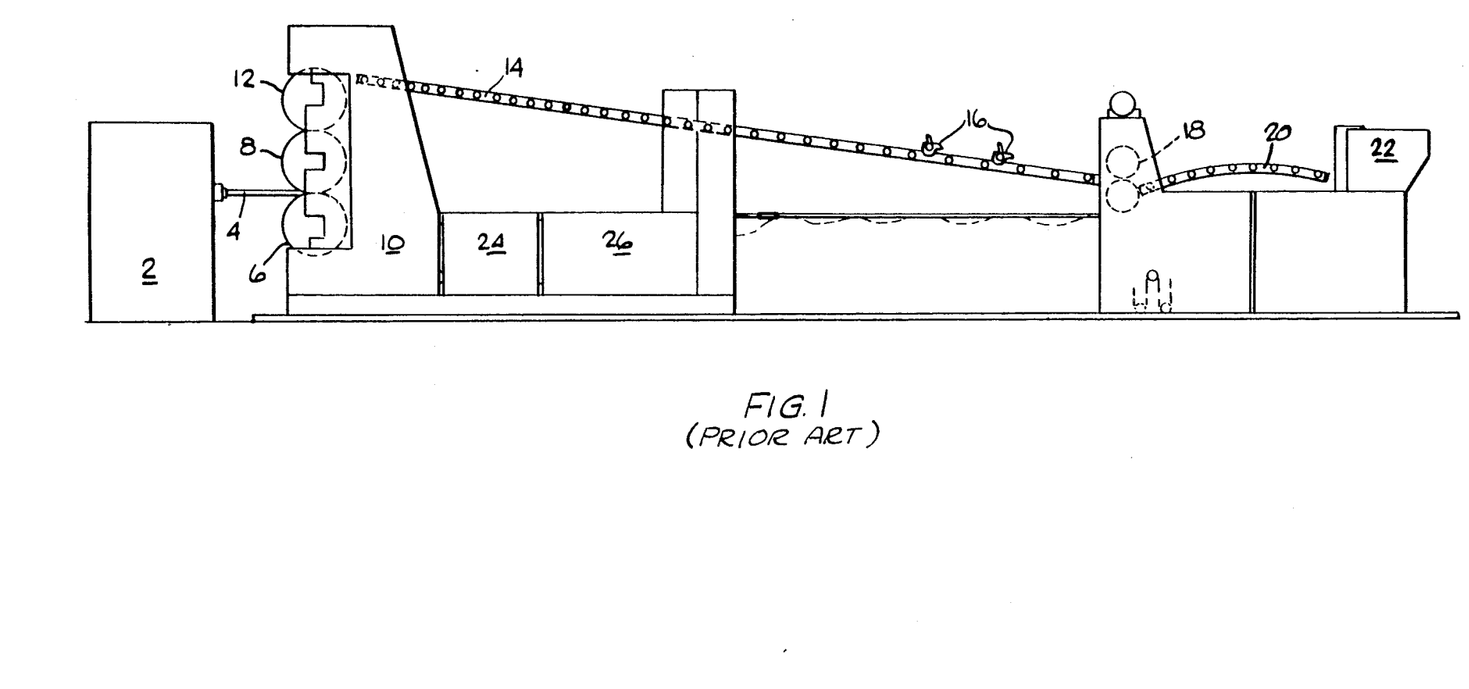
FIG. 1 is a schematic illustration of a conventional process line for forming a continuous sheet of a rigid thermoplastic material.

In FIG. 1, there is illustrated a conventional process line for forming a continuous sheet of a rigid thermoplastic material from a continuous extrudate of a hot thermoplastic material. The illustration in FIG. 1 is an upstack configuration. However, if desired, the apparatus could be a downstack configuration. An extruder 2 converts pellets of a thermoplastic material, such as a copolymer of polypropylene marketed by Hercules Powder Co. of Wilmington, Del., under the trade designation, PRO-FOX ®8623, into a continuous sheet 4 of a hot thermoplastic material which is fed into the nip between a lower chill roll 6 and an upper chill roll 8. Each of the chill rolls 6 and 8 are mounted in a support structure 10 for rotation about a fixed axis. Suitable means (not shown) are provided to adjust the spacing between opposite portions of the lower and upper chill rolls 6 and 8. Also, the lower and upper chill rolls 6 and 8 are driven by suitable means (not shown) so as to exert a pulling force on the extrudate leaving the extruder 2 so that the continuous sheet 4 has a desired thickness.

After passing between the lower and upper chill rolls 6 and 8, the continuous sheet 4 of the hot thermoplastic material moves with the upper chill roll 8 and passes through the nip between the upper chill roll 8 and a texturizing chill roll 12. If texturizing is not desired, then the chill roll 12 will have a plain surface. The texturizing chill roll 12 is also mounted in the support structure 10 for rotation about a fixed axis (not shown) and is rotated by suitable means (not shown) so as to exert a pulling force on the continuous sheet 4 so as to hold it in contacting relationship with the outer peripheral surface of the upper chill roll 8 so as to reduce the temperature of the continuous sheet 4 of thermoplastic material. As the continuous sheet 4 passes between the upper chill roll 8 and the texturizing chill roll 12, a suitable texture is provided on one surface of the continuous sheet 4 so as to increase its coefficient of friction. The continuous sheet 4 moves with the texturizing chill roll 12 and is transferred to a cooling conveyor 14. During passage over the cooling conveyor 14, the edge portions of the continuous strip are trimmed by slitters 16. The continuous sheet 4 passes between pull rolls 18 which exert a pulling force on the continuous sheet 4 to keep it in contact with the outer peripheral surface of the texturizing chill roll 12 and then over the cooling conveyor 14. The continuous sheet 4 is fed over a hump conveyor 20 into a shear apparatus 22 where it is cut into desired shapes. Other units of the process line comprise a chill roll drive module 24 and a heat exchange module 26.

Figure 2:
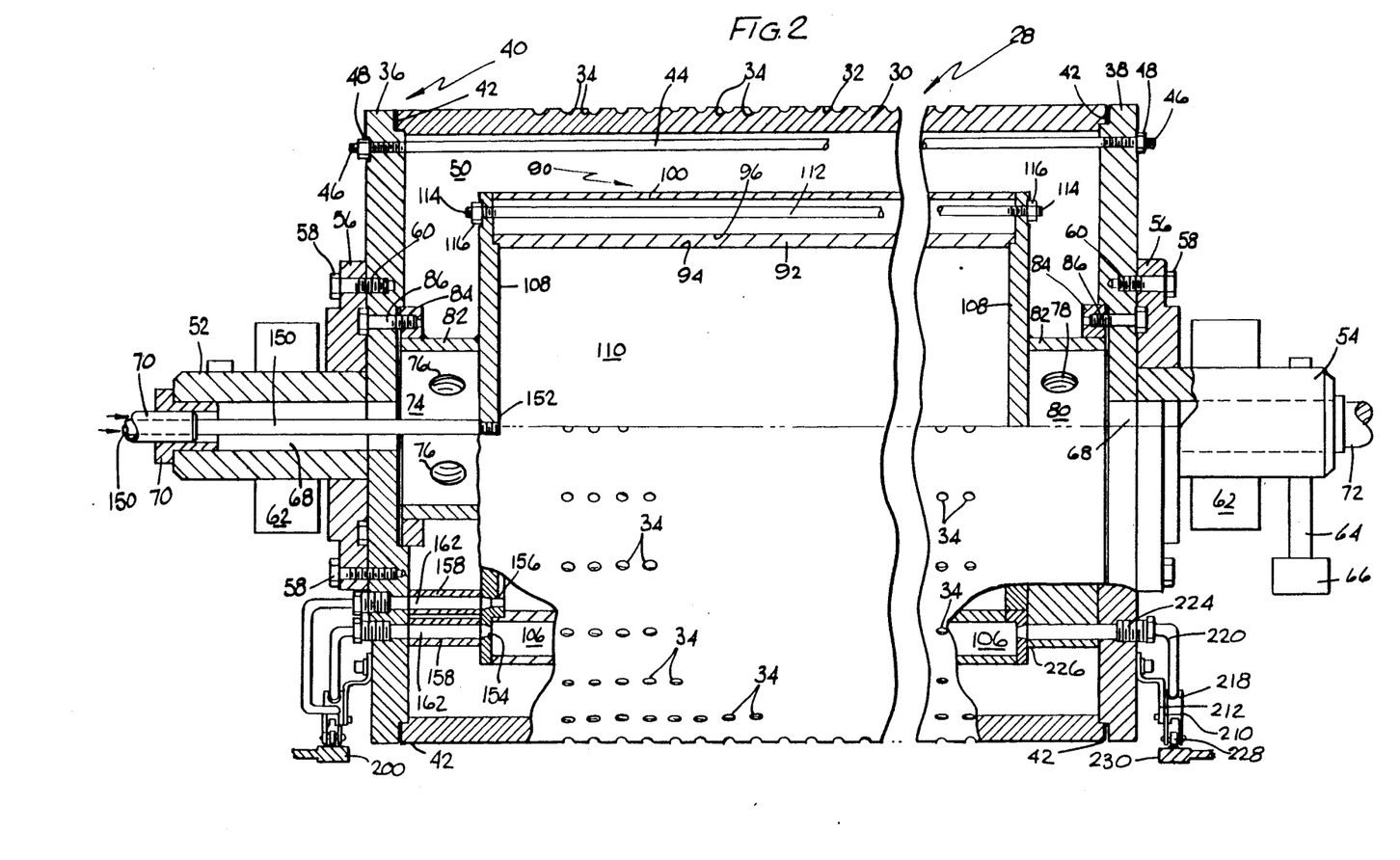
FIG. 2 is a front elevational view with parts in section of a forming drum of this invention.

An upper chill roll 8 for use in one preferred embodiment of this invention is illustrated in FIGS. 2-6. The chill roll 8 comprises a hollow watertight forming drum 28 comprising an elongated hollow forming cylinder 30 having a generally cylindrical outer peripheral surface 32 having a plurality of radially inwardly extending dimples 34 formed therein wherein the open portions of the dimples 34 face radially outwardly. The dimples 34 are in longitudinally extending spaced apart rows in parallel relationship. Each dimple is formed as a segment of a sphere or a frustum of a sphere. End covers 36 and 38 are provided for closing the ends of the hollow forming cylinder 30 and recesses and shoulders 40 provide for a mating joint with a sealing gasket 42 therebetween to form a watertight seal. Tie rods 44 having threaded end portions 46 extend through openings in the end covers 36 and 38 and threaded nuts 48 are threaded onto the threaded portions 46 and tightened to hold the end covers 36 and 38 in firm watertight engagement with the ends of the hollow forming cylinder 30 so as to form a hollow watertight housing 50. The tie rod 44 for the lower portion of FIG. 2 is not illustrated so that other portions of the apparatus can be illustrated.

Shafts 52 and 54 are mounted on end covers 36 and 38 by being welded to a mounting plate 56 which is secured by threaded bolts 58 threaded into threaded openings 60 in each of the end covers 36 and 38 so that the rotation of the shafts 52 and 54 rotates the hollow watertight forming drum 28. The shafts 52 and 54 are mounted for rotation in fixed bearing blocks 62 and shaft 54 is rotated by conventional means, such as driving belt 64 driven by conventional drive means 66. Each of the drive shafts 52 and 54 has a central axially extending passageway 68 through which cooling fluid, preferably water having solubles contained therein, flows as explained below. Cooling water is fed into the system through water pipe 70 and removed through water pipe 72. The cooling water flows through the passageway 68 into a distributing chamber 74 and flows out of the distributing chamber 74 through openings 76 into the hollow housing 50. The spent water flows out of the hollow housing 50 through openings 7B in a removal chamber 80 through passageway 68 into the water pipe 72. The longitudinal axes of the hollow forming cylinder 30 and the shafts 52 and 54 coincide. The distributing chamber 74 and the removal chamber 80 are each formed by a cylindrical wall 82 each of which is secured to a support ring 84 by suitable means such as by a continuous weld and each of which is mounted on the end covers 36 and 38 by threaded bolts 86 for rotation therewith and so that the longitudinal axes thereof coincide with the longitudinal axes of the shafts 52 and 54.

Figure 3:
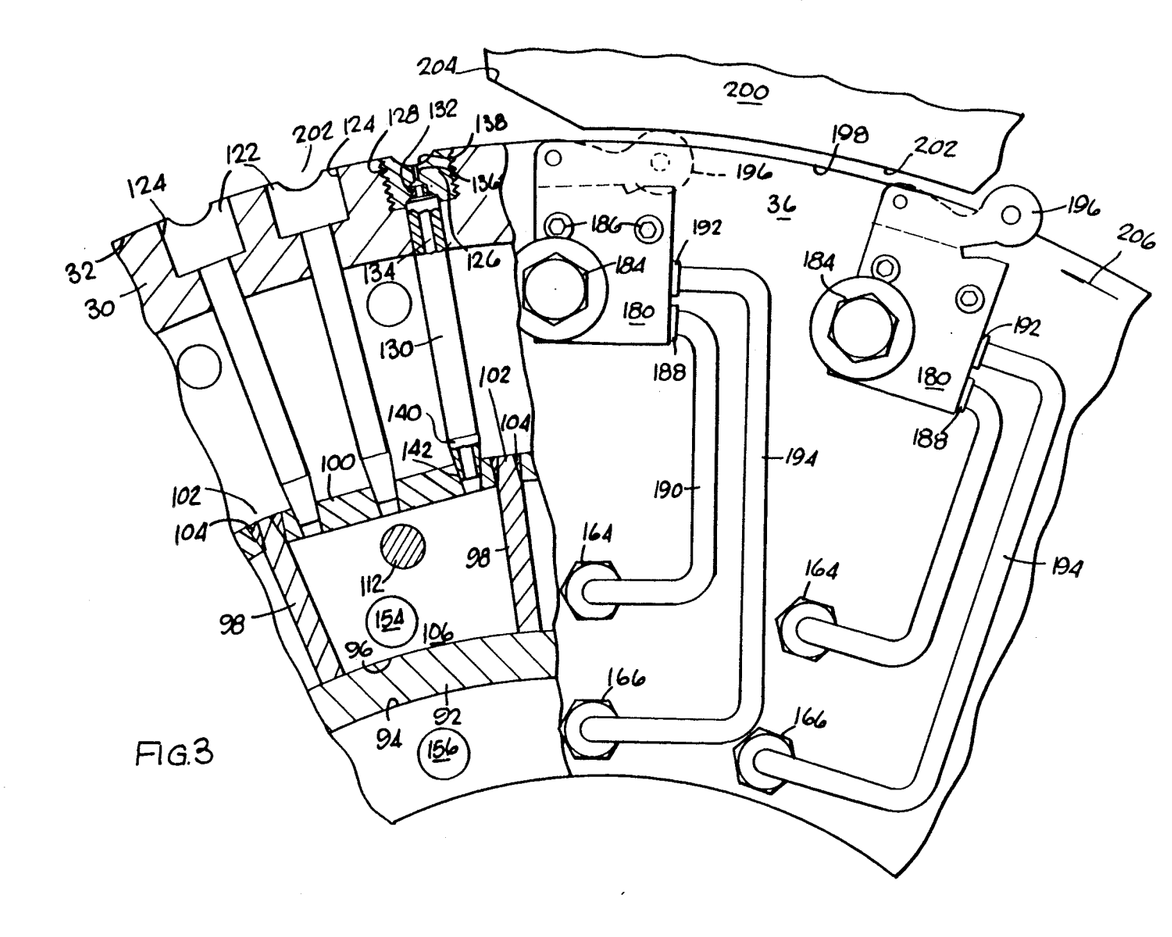
FIG. 3 is an enlarged end elevational view with parts in section of a portion of FIG. 2 from the left side thereof.
Figure 5:
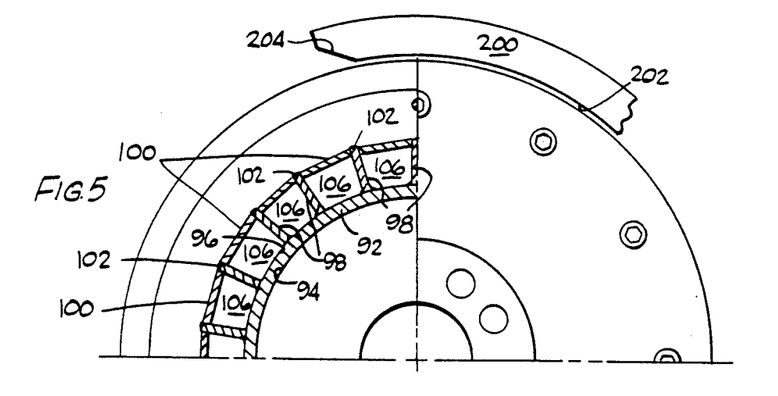
FIG. 5 is an end elevational view with parts removed and parts in section of a portion of FIG. 2 from the left side thereof.

A sealed vacuum drum 90 is provided and comprises an elongated hollow cylinder 92 having an inner cylindrical peripheral surface 94 and an outer cylindrical peripheral surface 96. A plurality of longitudinally extending spaced apart partition members 98, FIGS. 3 and 5, are secured on the outer surface 96 by suitable means, such as by continuous welding. A plate member 100 is secured to the radially outer ends 102 of adjacent partition members 98 by suitable means, such as continuous welds 104, so as to form a plurality of compartments 106. End covers 108, FIG. 2, are mounted in sealing engagement with the elongated hollow cylinder 92, the partition members 98 and the plate members 100 so that the compartments 106 are completely sealed in relation to the vacuum chamber 110 formed by the elongated hollow cylinder 92 and the end covers 108 and the hollow housing 50. One end cover 108 is secured to the cylindrical wall 82 of the distributing chamber 74 by suitable means, such as a continuous weld, and the other end cover 108 is secured to the cylindrical wall 82 of the removal chamber 80 by suitable means, such as a continuous weld, for rotation therewith and so that the longitudinal axis of the sealed vacuum drum 90 coincides with the longitudinal axes of the shafts 52 and 54 and the hollow forming cylinder 30. The end covers 108 are held in sealing engagement with the elongated hollow cylinder 92, the partition members 98 and the plate members 100 by a plurality of tie rods 112 having threaded end portions 114 which extend through openings in the end covers 108. Threaded nuts 116 are threaded onto the threaded end portions 114 and tightened so as to hold the end covers 108 in the sealed relationship. Suitable sealing means (not shown), such as a sealing gasket, are used to ensure the sealed relationship. The rod 112 for the lower portion of FIG. 2 is not illustrated.

The formation of the dimples 34 is illustrated in FIG. 3 and comprises a plurality of spaced apart openings 122 having cylindrical sidewalls 124 and extending radially inwardly a short distance from the outer peripheral surface 32 of the forming cylinder 30. A plug member 126 has a cylindrical outer peripheral sidewall 128 which is dimensioned to mate with the cylindrical sidewall 124 and to be in threaded engagement therewith. Prior to the assembly of the plug 126 into the opening 122, a hollow rod 130 is threaded into an opening 132 in the bottom of the plug 126 so that the passageway 134 therein is in fluid communication with an orifice 136 extending through the plug member 126 from each dimple 34. The plug member 126 is provided with a surface 138 which is in the form of a segment of a sphere. The other end 140 of the hollow rod 130 is in threaded engagement with a tapered opening 142 which extends through each plate member 100. As illustrated in FIG. 3, three longitudinally extending rows of dimples 34 have plugs 126 and hollow rods 130 providing fluid communication with one of the compartments 106. Sealant (not shown) is applied to all the threaded engagements to ensure fluid tightness thereof. Each plug 126 originally has an outwardly extending projection (not shown) which has suitable means to be engaged by a tool so as to assemble the plug 126 and the hollow rod 130 into the plate member 100 which projection is ground off after assembly to provide the cylindrical outer surface 32. The hollow rods 130 provide support for the hollow forming cylinder 30 so that it can have a smaller thickness so as to increase the cooling efficiency of the coolant flowing through the hollow forming cylinder 30.

Figure 6:
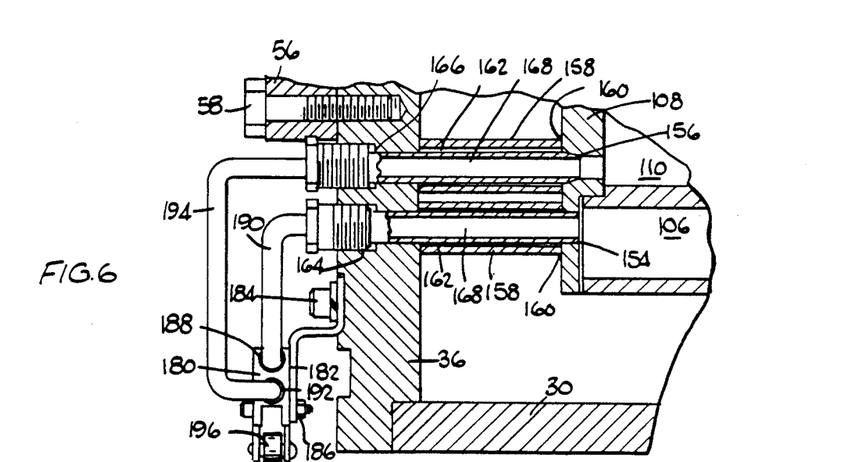
FIG. 6 is an enlarged front elevational view with parts in section of a portion of the lower left side of FIG. 2.

The system for providing vacuum to the dimples 34 at appropriate times is illustrated in FIGS. 2, 3, 5 and 6. A vacuum tube 150 is connected to suitable means for forming a vacuum (not shown) and extends through the passageway 68 and distributing chamber 74 and is connected in an opening 152 in the end cover 108 by suitable means, such as a threaded sealed engagement, so as to provide fluid communication with the vacuum chamber 110. Each compartment 106 is provided with a threaded opening 154, FIG. 6, extending in an axial direction through the end cover 108. The end cover 108 also has a plurality of threaded openings 156 extending therethrough in an axial direction and opening into the vacuum chamber 110. The threaded openings 154 and 156 are in radial alignment but are not necessarily in such arrangement. A plurality of hollow cylindrical spacers 158 are secured to the end cover 108 by suitable means such as continuous welds 160 so that the passageways 162 therein are aligned with the openings 154 and 156. A plurality of threaded openings 164 extend through the end cover 36 in axial directions with each of the threaded openings 164 being aligned with one of the threaded openings 154. Also, another plurality of threaded openings 166 extend through the end cover 36 in axial directions with each of the threaded openings 166 being in alignment with one of the threaded openings 156. As illustrated in FIG. 6, a hollow vacuum port pin 168 is threadedly engaged in each of the threaded openings 154 and 156 and 164 and 166 with a suitable thread sealant being used. The spacers 158 prevent the end covers 36 and 108 from deflecting when the vacuum port pins 168 are tightened.

A plurality of spaced apart valves 180 are mounted on the end cover 36 by a ring shaped support bracket 182 which is secured to the end cover 36 by threaded bolts 184 and to each valve 180 by threaded nuts 186. Each valve 180 has a port 188 that is connected by tubing and suitable fittings 190 to a vacuum port pin 168 in the threaded opening 164 and a port 192 that is connected by tubing and suitable fittings 194 to a vacuum port pin 168 in the threaded opening 166. A cam follower 196 is pivotally mounted on each valve 180 and is resiliently urged radially outwardly by suitable means (not shown). The cam follower 196 is connected by conventional means (not shown) to open or close a passageway extending between and in fluid communication with the ports 188 and 192. The cam follower 196 in its normal position shown by the solid lines in FIG. 3, for illustration purposes only, extends radially outwardly from the outer peripheral surface 198 of the end cover 36. At the location illustrated in FIG. 3, the cam follower 196 would actually have been moved radially inwardly by the cam 200. In this position, the passageway extending between the ports 188 and 192 is in an opened position so that a vacuum is formed in the associated compartment 106. The cam member 200 is mounted at a fixed location on a support structure (not shown) and has a arcuate cam surface 202 spaced a short distance from the outer peripheral surface 198 which distance is sufficient to move the cam follower 196 radially inwardly, as illustrated by the dashed lines, so as to close the passageway between the ports 188 and 192 and to vent port 188 to the atmosphere. The cam member 200 is provided with an inclined surface 204 at the beginning and end thereof so as to gradually move the cam follower 196 between an opened or a closed position. The cam member 200 is mounted so that it extends from a location between about 5 and 15 degrees, preferably about 12.5 degrees, before the nip between the new upper chill roll 8 and the texturizing chill roll 12 in the direction of rotation thereof as illustrated by the arrow 206 in FIG. 3 and between about 5 and 15 degrees, preferably about 12.5 degrees, after the nip between the lower chill roll 6 and the upper chill roll 8.

Figure 7:
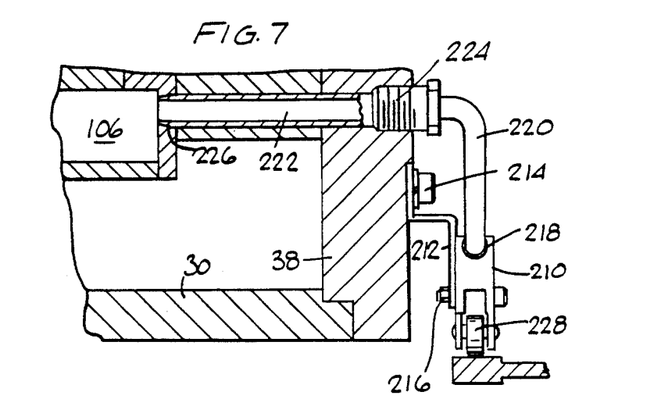
FIG. 7 is an enlarged front elevational view with parts in section of the lower right side of FIG. 2.
Figure 8:
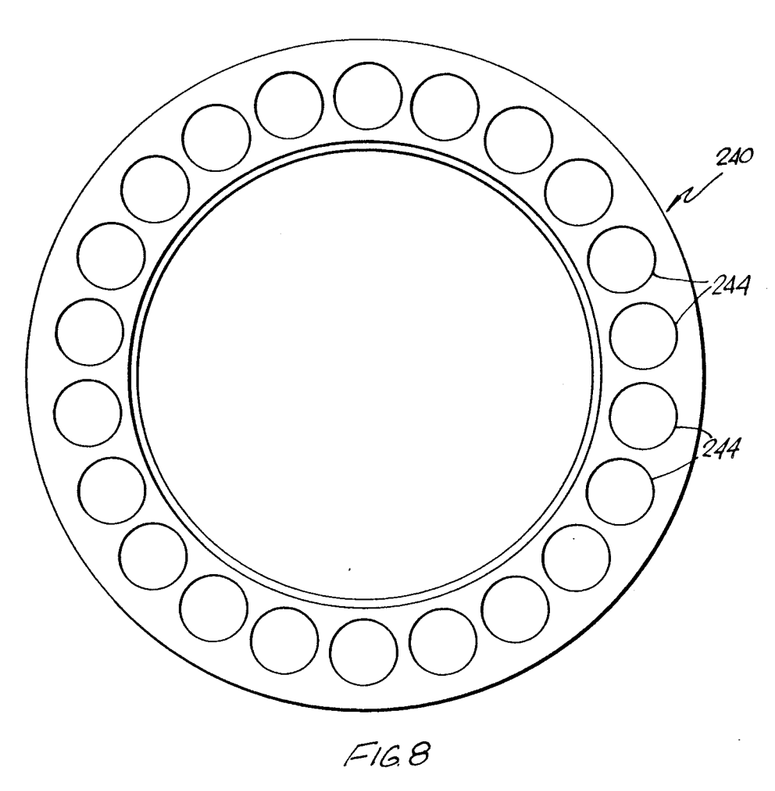
FIG. 8 is an end elevational view of another form of a vacuum roll with the end cover removed.
Figure 9:
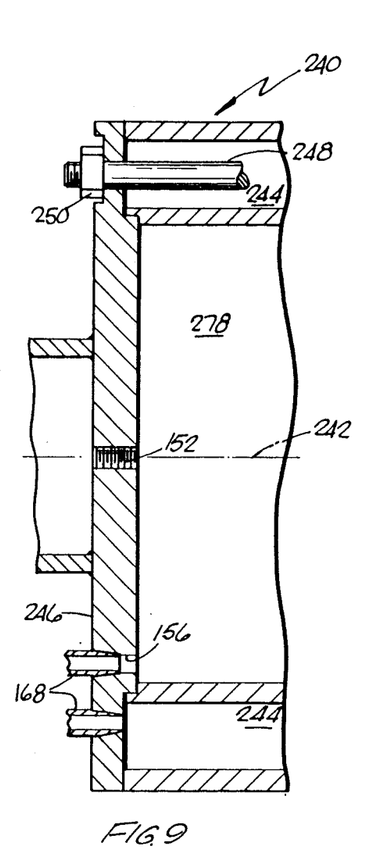
FIG. 9 is a cross-sectional view of an end portion of the vacuum roll of FIG. 8.

Another plurality of spaced apart valves 210 are mounted on the end cover 38, FIGS. 2 and 7, by a ring shaped bracket 212 which is secured to the end cover 38 by threaded bolts 214 and to each valve 210 by threaded nuts 216. Each valve 210 has a port 218 that is connected by tubing and suitable fittings 220 to a port pin 222 having one end secured in the threaded opening 224 in the end cover 38 and the other end secured in threaded opening 226 in each compartment 106. A cam follower 228 is pivotally mounted on each valve 210 and is resiliently urged radially outwardly by suitable means (not shown). The cam follower 228 is connected by conventional means (not shown) to open or close each compartment 106 to the atmosphere. In its normal position, the cam follower 228 is in a closed position while the vacuum is being formed in each compartment. A cam member 230, similar to the cam member 200, functions to move the cam follower 228 to open the passageway to the atmosphere so that the continuous sheet will move off of the hollow forming cylinder 30.

Figure 4:
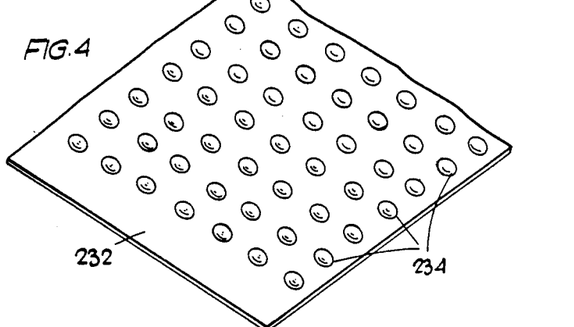
FIG. 4 is a perspective view of a portion of a continuous sheet of a rigid thermoplastic material having dimples formed therein.

In operation, the lower chill roll 6 the new upper chill roll 8 of this invention and the texturizing chill roll 12 are mounted and rotated in the conventional manner. Cooling water flows through the water pipe 70 and passageway 68 into the distributing chamber 74 and then out through the openings 76 into the hollow housing 50. When the space in the hollow housing 50 between the hollow forming cylinder 30 and the vacuum drum 90 has been filled with the cooling water, the flow continues out through the openings 78, the removal chamber 80 and the water pipe 72. During the normal operation of the apparatus, the flow of the cooling water is continuous so that a constant flow moves over the inner peripheral surface of the hollow forming cylinder 30 so as to maintain it at the desired operating temperature. The vacuum tube 150 is connected to the vacuum source so that a vacuum exists in the vacuum chamber 110 of the sealed vacuum drum 90. The cam member 200 is mounted on the support structure 10 so that the inclined surface 204 is located about 12.5 degrees before the nip between the upper chill roll 8 and the texturizing chill roll 12. The continuous sheet 4 of the hot thermoplastic material from the extruder 2 is fed into the nip between the lower chill roll 6 and the new upper chill roll 8 of this invention After the cam follower 196 moves past the inclined surface 204 so that it is no longer in contact with the cam 200, it moves radially outwardly to open the passageway between the ports 188 and 192 to connect an associated compartment 106 to the vacuum in the vacuum chamber 110. Once the compartment 106 has been connected to the vacuum, it functions through the tubes 130 to connect the orifices 136 in the three longitudinally extending rows of dimples 34 to the vacuum source so as to draw the portions of the hot thermoplastic material covering the dimples 34 into conformation with the spherical surface 138 of each dimple 34. As the new upper chill roll 8 continues to rotate, the formation of dimples in the continuous sheet is continued in each succeeding increment thereof. The pulling force generated at the nip between the new upper roll 8 and the texturizing chill roll 12 and the vacuum in the dimples 34 hold the hot thermoplastic material in close contact with the outer peripheral surface 32 of the hollow forming cylinder 30 so as to gradually cool the hot thermoplastic material to a desired temperature. As the cam follower 196 approaches the nip between the new upper chill roll 8 and the texturizing chill roll 12, it moves over the inclined surface 204 and moves radially outwardly to close the passageway between the ports 188 and 192 so that no vacuum is being applied to the continuous sheet. By the time the continuous sheet has passed through the nip between the new upper chill roll 8 and the texturizing chill roll 12, it has been cooled enough so that the continuous sheet 4 may be moved through the rest of the process without any detrimental damage to the dimples formed in the continuous sheet 4. As illustrated in FIG. 4, the apparatus functions to produce a continuous sheet 232 of a rigid thermoplastic material having a plurality of dimples 234 formed therein.

Figure 10:
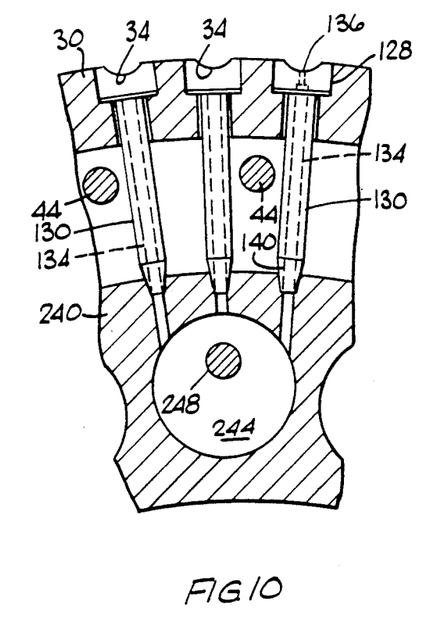
FIG. 10 is a cross-sectional view of portions of the vacuum roll of FIG. 8 and a hollow forming cylinder.

Another preferred embodiment of the invention is illustrated in FIGS. 8-12. A hollow vacuum drum 240 having a central longitudinal axis 242 is mounted in a hollow forming cylinder 30 in the same manner as the hollow vacuum drum 90 of FIG. 2. The vacuum drum 240 has a plurality of spaced apart axially extending bores 244. An end cover 246 is provided for each end of the vacuum drum 240 and they are held in place by tie rods 248 and nuts 250. A plurality of threaded openings 252 are provided in the end cover 246 so that a vacuum port pin 168 may be mounted therein to provide a passageway to each bore 244 similar to the arrangement described above. As illustrated in FIG. 10, each bore 244 is connected to three rows of dimples 34 using hollow rods 130 in the same manner as the compartments 106 are connected to the dimples 34.

Figure 11:
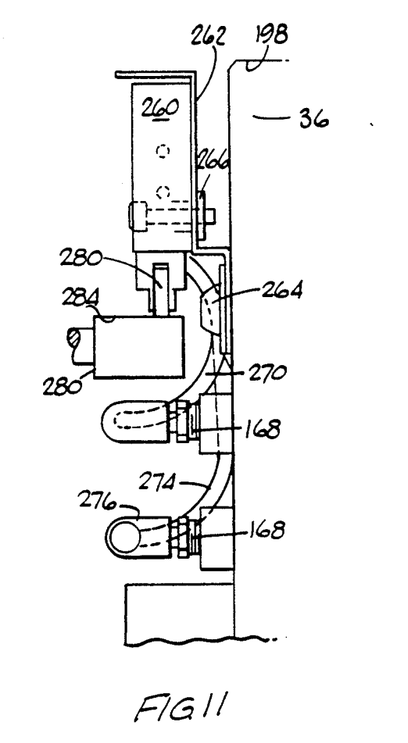
FIG. 11 is an elevational view of a control system.
Figure 12:
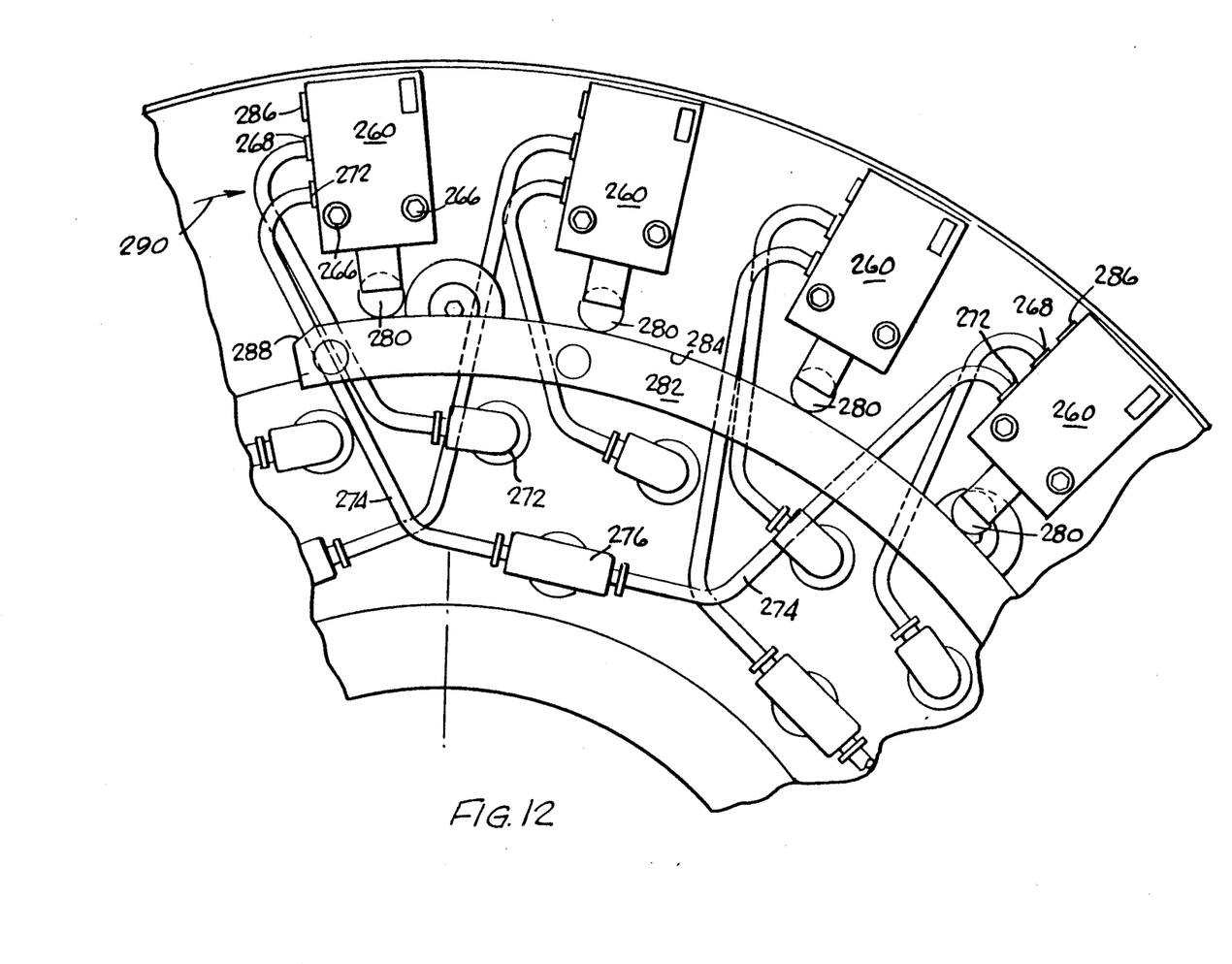
FIG. 12 is an enlarged end elevational view of FIG. 11.

The system for forming a vacuum in each bore 244 is illustrated in FIGS. 11 and 12. A plurality of spaced apart valves 260 are mounted on the end cover 36 by a ring shaped support bracket 262 which is secured to the end cover 36 by threaded bolts 264 and to each valve 260 by threaded nuts 266. Each valve 260 has a port 268 that is connected by tubing and suitable fittings 270 to a vacuum port pin 168 mounted in an axially extending threaded opening 252 in each bore 244, as described above, a port 272 that is connected by tubing and suitable fittings 274 to a tee fitting 276 connected to a vacuum port pin 168 extending from the vacuum chamber 278 in the vacuum drum 240 as described above. A cam follower 280 is mounted on each valve 260 and is resiliently urged radially inwardly by suitable means (not shown). The cam follower 280 is connected by conventional means (not shown) to open or close a passageway extending between and in fluid communication with the ports 268 and 272. The cam follower 280 in its normal position extends radially inwardly from the outer peripheral surface 198 of the end cover 36. In this position, the passageway extending between the ports 265 and 272 is in an opened position so that a vacuum is formed in the associated bore 244. A cam member 282 is mounted at a fixed location on a support structure (not shown) and has an arcuate cam surface 284 spaced a short distance from the outer peripheral surface 198 which distance is sufficient to move the cam follower 280 radially outwardly so as to close the passageway between the ports 268 and 272 and to vent port 268 to the atmosphere through port 286. The cam member 288 is provided with an inclined surface at the beginning and end thereof so as to gradually move the cam follower 280 between an opened or a closed position. The cam member 282 is mounted so that it extends from a location between about 5 and 15 degrees, preferably about 12.5 degrees, before the nip between the new upper chill roll 8 and the texturizing chill roll 12 in the direction of rotation of the upper chill roll 8 as indicated by the arrow 290 and between about 5 and 15 degrees, preferably about 12.5 degrees, after the nip between the lower chill roll 6 and the new upper chill roll 8.

The embodiment illustrated in FIGS. 8-12 also has a plurality of valves on the right hand side which are the same as valves 210 described above. The embodiment illustrated in FIGS. 8-12 operates in the same manner as the embodiment in FIGS. 1-7.

The new vacuum chill roll 8 permits the temperature controlling fluid to move over the inner peripheral surface of the hollow forming cylinder 30 in direct contact therewith so that it can effectively control the temperature of the chill roll 8. The plug members 126 and the hollow rods 130 provide rigidity for the hollow forming cylinder 30 using the rigid vacuum drum 240 as a base support so that the thickness of the hollow forming cylinder may be held to a minimum so as to increase its effectiveness. Also, since the plug members 126 and the hollow rods 130 are removable, the vacuum formed shape can be changed without rebuilding the entire roll.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. Apparatus for use in forming a continuous sheet of a rigid thermoplastic material having a plurality of recesses formed in one surface thereof and projections formed on the other surface thereof comprising:
   a fluid tight forming drum having a generally cylindrical outer peripheral surface having a plurality of radially inward extending recesses formed therein and an inner peripheral surface;
   mounting means for mounting said fluid tight forming drum for rotation about a fixed axis;
   rotating means for rotating said fluid tight forming drum;
   cooling means for directing a flow of cooling fluid over said inner peripheral surface for maintaining said fluid tight forming drum at a desired temperature;
   feeding means for feeding successive portions of a continuous sheet of heated thermoplastic material into contact with successive portions of said outer peripheral surface of said fluid tight forming drum;
   force applying means for applying a force to said successive portions of said continuous sheet to hold said successive portions in contact with said successive portions of said outer peripheral surface;
   vacuum forming means connected to said recesses located in said successive portions of said outer peripheral surface to draw areas of said successive portions of said heated thermoplastic material into conformation with each of said recesses;
   said vacuum forming means comprises a hollow drum located within said fluid tight forming drum and forming an annular space between said forming drum and said hollow drum for passage of said cooling fluid;
   vacuum cut-off means for discontinuing said vacuum when said heated thermoplastic material has been cooled to a desired temperature so that said successive portions thereof may be removed from said fluid tight forming drum; and
   removing means for removing said cooled successive portions from said fluid tight forming drum as a continuous sheet of a rigid thermoplastic material having a plurality of recesses formed in one surface thereof and a plurality of projections formed in the other surface thereof.

2. Apparatus as in claim 1 and further comprising:
   vacuum forming means for forming a vacuum in said hollow vacuum drum;
   mounting means for mounting said vacuum drum for rotation with said fluid tight forming drum about said fixed axis of rotation;
   connecting means for connecting said hollow vacuum drum to said recesses; and
   control means for periodically connecting a portion of said recesses to said vacuum in said hollow vacuum drum to draw said areas of said successive portions of said heated thermoplastic material into conformation with said recesses.

3. Apparatus as in claim 2 and further comprising:
   said hollow vacuum drum having outer and inner peripheral surfaces;
   a plurality of axially extending compartments located between said outer and inner peripheral surfaces; and
   said connecting means comprises first connecting means for connecting said compartments to said recesses and second connecting means for connecting said compartments to said vacuum in said hollow vacuum drum.

4. Apparatus as in claim 3 wherein:
   said first connecting means comprising conduit means extending between said compartments and said recesses to form fluid passageways therebetween; and
   said second connecting means comprising tubing means extending between said vacuum in said hollow vacuum drum and said control means and between said control means and one of said compartments to provide said vacuum for said recesses.

5. Apparatus as in claim 4 wherein said control means comprises:
   a plurality of valve means each of which is mounted on said fluid tight forming drum for rotation therewith and each of which has at least an inlet port, an outlet port and a passageway extending between said inlet port and said outlet port and each of said plurality of valve means functioning to open or close said passageway; and said tubing means connected to said inlet and outlet ports.

6. Apparatus as in claim 5 and further comprising:
an actuating member projecting outwardly from each of said valve means and movable between an opened or closed position so as to open or close said passageway;
resilient means for urging said actuating means to said opened position; and
cam means mounted at a fixed location to be contacted by said actuating member to move it to said closed position.

7. Apparatus as in claim 6 and further comprising:
a first chill roll having an outer peripheral surface;
mounting means for mounting said first chill roll for rotation about a relatively fixed axis which is parallel to said axis of rotation of said fluid tight forming drum and located so as to form a nip between said outer peripheral surface of said first chill roll and said outer peripheral surface of said fluid tight forming drum;
said feeding means feeding said continuous sheet into said nip so that said continuous sheet contacts each of said outer peripheral surfaces;
a second chill roll having an outer peripheral surface;
mounting means for mounting said second chill roll for rotation about a relatively fixed axis which is parallel to said axis of rotation of said fluid tight forming drum and located so as to form a nip between said outer peripheral surface of said second chill roll and said outer peripheral surface of said fluid tight forming drum;
said force applying means comprising a pulling force applied to said continuous sheet of thermoplastic material as it passes through said nip between said second chill roll and said fluid tight forming drum; and
said cam means beginning at a location between about 5 and 15 degrees before said nip between said second chill roll and said fluid tight forming drum in the direction of rotation thereof and ending at a location between about 5 and 15 degrees after said nip between said fluid tight forming drum and said first chill roll.

8. Apparatus for use in forming a continuous sheet of a rigid thermoplastic material having a plurality of recesses formed in one surface thereof and projections formed on the other surface thereof comprising:
a hollow forming cylinder having open ends and having an outer peripheral surface having means for forming a plurality of radially inwardly extending recesses therein;
end covers secured to said open ends in sealed relationship therewith so as to form a closed housing;
mounting means for mounting said hollow forming cylinder for rotation about a fixed axis;
rotating means for rotating said hollow forming cylinder;
a vacuum drum located within said hollow forming cylinder and having a peripheral outer surface;
vacuum forming means for forming a vacuum in said vacuum drum;
securing means for securing said vacuum drum to said end covers of said hollow forming cylinder for rotation therewith and located so as to form at least a generally annular space between said hollow forming cylinder and said vacuum drum and wherein a fluid tight relationship exists between said vacuum drum and said generally annular space;
a plurality of axially extending fluid tight compartments in said vacuum drum;
cooling fluid supply means for supplying cooling fluid into said generally annular space to maintain said hollow forming cylinder at a desired temperature;
cooling fluid outlet means for removing said cooling fluid from said generally annular space;
a plurality of conduit means extending between said recesses and said compartments to provide a plurality of fluid passageways therebetween;
each of said passageways having an opening in one of said recesses and an opening in one of said compartments;
feeding means for feeding successive portions of a continuous sheet of a heated thermoplastic material into contact with successive portions of said outer peripheral surface of said hollow forming cylinder;
control means connected to said vacuum drum and to each of said compartments for forming a vacuum in each of said compartments during at least a portion of one revolution thereof;
said control means forming said vacuum in each compartment after the portion of said outer peripheral surface of said hollow forming cylinder associated with each of said compartments has been contacted by successive portions of said continuous sheet of heated thermoplastic material to draw spaced apart areas of said successive portions into conformation with said recesses;
said control means discontinuing said vacuum in each of said compartments when said successive portions have been cooled to a desired temperature so that said successive portions may be removed from said hollow forming cylinder; and
removing means for removing said successive portions from said hollow forming cylinder as a continuous sheet of rigid thermoplastic material having a plurality of recesses formed in one surface thereof and a plurality of projections on the other surface thereof.

9. Apparatus as in claim 8 and further comprising:
said vacuum drum having an inner peripheral surface;
said plurality of axially extending fluid tight compartments located between said outer and inner peripheral surfaces of said vacuum drum.

10. Apparatus as in claim 9 wherein said means for forming a plurality of recesses comprises:
said outer peripheral surface of said hollow forming cylinder having a plurality of radially inwardly extending openings having a cylindrical sidewall formed therein;
a plurality of plugs each of which is secured in one of said openings in a fluid tight relationship therewith; and
each of said plugs having a radially inwardly extending recess formed therein.

11. Apparatus as in claim 10 wherein:
each of said recesses is a segment of a sphere.

12. Apparatus as in claim 10 and further comprising:
each of said plugs having an opening extending therethrough in a radially inward direction;
said vacuum drum having a plurality of openings extending radially inwardly from said outer peripheral surface thereof with each of said openings having an opening into one of said compartments; and a plurality of conduits each having one end thereof in fluid tight engagement with one of said openings in one of said plugs and the other end thereof in fluid tight engagement with one of said openings in said vacuum drum to form fluid tight passageways between said plugs and said compartments.

13. Apparatus as in claim 12 and further comprising:
vacuum forming means for forming a vacuum in said vacuum drum;
connecting means for connecting said vacuum in said vacuum drum with each of said compartments; and
control means in said connecting means to form or not to form a vacuum in each of said compartments.

14. Apparatus as in claim 13 wherein:
said control means forms a vacuum in each compartment during a portion of each revolution thereof.

15. Apparatus as in claim 13 wherein said connecting means comprises:
a first plurality of vacuum tubes, each having one end thereof in fluid tight engagement with said vacuum in said vacuum drum and the other end thereof in fluid tight engagement with one of said end covers of said forming cylinder to form a passageway in fluid communication with said vacuum in said vacuum drum;
a second plurality of vacuum tubes, each having one end thereof in fluid tight engagement with said one of said compartments of said hollow member and the other end thereof in fluid tight engagement with said one of said end covers of said hollow forming cylinder to form a passageway in fluid communication with one of said compartments;
a plurality of valve means each of which is mounted on said one of said end covers of said hollow forming cylinder for rotation therewith and each of which has at least an inlet port, an outlet port, and a passageway extending between said inlet port and said outlet port and said valve means functioning to open or close said passageway; and
tubing means for connecting said first and second plurality of vacuum tubes to said inlet and outlet ports.

16. Apparatus as in claim 15 and further comprising:
an actuating member projecting outwardly from each of said valve means and movable between an opened or closed position so as to open or close said passageway;
resilient means for urging said actuating member to said opened position; and
cam means mounted at a fixed location to be contacted by said actuating member to move it to said closed position.

17. Apparatus as in claim 16 and further comprising:
a first chill roll having an outer peripheral surface;
mounting means for mounting said first chill roll for rotation about a relatively fixed axis which is parallel to and below said axis of rotation of said hollow forming cylinder and located so as to form a nip between said outer peripheral surface of said first chill roll and said outer peripheral surface of said hollow forming cylinder;
said feeding means feeding said continuous sheet into said nip so that said continuous sheet contacts each of said outer peripheral surfaces;
a second chill roll having an outer peripheral surface;
mounting means for mounting said second chill roll for rotation about a relatively fixed axis which is parallel to and above said axis of rotation of said hollow forming cylinder and located so as to form a nip between said outer peripheral surface of said second chill roll and said outer peripheral surface of said hollow forming cylinder;
force applying means for applying a force to said successive portions of said continuous sheet to hold said successive portions in contact with said successive portions of said outer peripheral surface of said hollow forming cylinder;
said force applying means comprising a pulling force applied to said continuous sheet of thermoplastic material as it passes through said nip between said second chill roll and said hollow forming cylinder; and
said cam means beginning at a location between about 5 and 15 degrees before said nip between said second chill roll and said hollow forming cylinder in the direction of rotation thereof and ending at a location between about 5 and 15 degrees after said nip between said hollow forming cylinder and said first chill roll.

18. Apparatus as in claim 8 wherein said vacuum drum comprises:
a hollow member having a longitudinal axis and open ends;
said hollow member having generally cylindrical outer and inner peripheral surfaces;
a plurality of spaced apart axially extending bores located between said outer and inner peripheral surfaces; and
end covers secured to said hollow member to form a central sealed fluid tight vacuum chamber and a plurality of fluid tight compartments around said central vacuum chamber.

19. Method for forming a continuous flat sheet of a heated soft thermoplastic material into a continuous sheet of a cooled rigid thermoplastic material having a plurality of recesses formed in one surface thereof and a plurality of projections on the other surface thereof using a hollow fluid tight forming drum having a generally cylindrical outer peripheral surface having a plurality of radially inwardly extending recesses formed therein and having an inner peripheral surface and a vacuum drum mounted within said forming drum to provide an annular space therebetween between and which fluid tight forming drum is rotating about a fixed axis of rotation comprising:
feeding successive portions to a continuous sheet of a heated soft thermoplastic material into contact with the successive portions of said outer peripheral surface of said hollow fluid tight forming drum;
applying a force to said successive portions of said continuous sheet to draw said successive portions into contact with said outer peripheral surface for rotation therewith;
applying a vacuum to each of said recesses in said successive portions of said outer peripheral surface to draw areas of said successive portions of said continuous sheet radially opposite to said recesses into conformation with said recesses;
flowing cooling fluid through said annular space and in contact with said inner peripheral surface so as to maintain said hollow fluid tight forming drum at a temperature to cool said heated soft thermoplastic material;

maintaining said vacuum until said continuous sheet has cooled to a temperature at which it is self-supporting so that it may be removed from said hollow fluid tight forming drum without having any detrimental effect on the shape of the recesses formed therein;

discontinuing the application of said vacuum through said recesses; and removing said cooled thermoplastic material as a continuous sheet of a rigid thermoplastic material having a plurality of recesses formed in one surface thereof and a plurality of projections formed on the other surface thereof.

20. A method as in claim 19 and further comprising: shaping each of said recesses as a segment of a sphere.

* * * * *